United States Patent
Kamann et al.

(10) Patent No.: US 10,208,405 B2
(45) Date of Patent: Feb. 19, 2019

(54) POLYLACTIDE FIBERS

(71) Applicant: NatureWorks LLC, Minnetonka, MN (US)

(72) Inventors: Chad Henry Kamann, Carver, MN (US); Robert A. Green, Raleigh, NC (US)

(73) Assignee: NatureWorks LLC, Minnetonka, MN (US)

( * ) Notice: Subject to any disclaimer, the term of this patent is extended or adjusted under 35 U.S.C. 154(b) by 45 days.

(21) Appl. No.: 15/194,821

(22) Filed: Jun. 28, 2016

(65) Prior Publication Data

US 2016/0305045 A1  Oct. 20, 2016

Related U.S. Application Data

(63) Continuation of application No. 14/360,643, filed as application No. PCT/US2012/069618 on Dec. 14, 2012, now Pat. No. 9,404,032.

(60) Provisional application No. 61/576,736, filed on Dec. 16, 2011.

(51) Int. Cl.

| | |
|---|---|
| *D01F 6/62* | (2006.01) |
| *D01F 6/92* | (2006.01) |
| *C08L 67/04* | (2006.01) |
| *C09K 8/44* | (2006.01) |
| *C09K 8/56* | (2006.01) |
| *C09K 8/62* | (2006.01) |
| *C09K 8/70* | (2006.01) |
| *C09K 8/80* | (2006.01) |
| *C09K 8/467* | (2006.01) |
| *E21B 43/26* | (2006.01) |
| *A01G 13/02* | (2006.01) |

(52) U.S. Cl.
CPC ........... *D01F 6/92* (2013.01); *A01G 13/0275* (2013.01); *C08L 67/04* (2013.01); *C09K 8/44* (2013.01); *C09K 8/467* (2013.01); *C09K 8/56* (2013.01); *C09K 8/62* (2013.01); *C09K 8/70* (2013.01); *C09K 8/80* (2013.01); *D01F 6/625* (2013.01); *E21B 43/26* (2013.01); *C09K 2208/08* (2013.01); *D10B 2331/041* (2013.01); *D10B 2505/18* (2013.01)

(58) Field of Classification Search
CPC ......... C09K 8/35; C09K 2208/08; D01F 6/92; D01F 6/625; D10B 2331/041
USPC ........................................ 507/219, 260, 267
See application file for complete search history.

(56) References Cited

U.S. PATENT DOCUMENTS

| | | |
|---|---|---|
| 6,506,873 B1 | 1/2003 | Ryan |
| 6,949,491 B2 | 9/2005 | Cooke |
| 7,267,170 B2 | 9/2007 | Mang |
| 2006/0159918 A1 | 7/2006 | Dugan |
| 2007/0141286 A1* | 6/2007 | Takase ................... C08J 9/0023 428/36.92 |
| 2009/0053489 A1* | 2/2009 | Yamamura ................ B32B 9/04 428/213 |
| 2009/0169844 A1 | 7/2009 | Yamamura |
| 2010/0130699 A1* | 5/2010 | Ikegame ................ C08L 67/04 525/411 |
| 2010/0221471 A1 | 9/2010 | Green |

FOREIGN PATENT DOCUMENTS

| | | |
|---|---|---|
| EP | 2138542 A | 12/2009 |
| JP | 2002-065079 A | 3/2002 |
| WO | 2002-077335 A | 10/2002 |
| WO | 2004-059058 A | 7/2004 |
| WO | 2006-137002 A | 12/2006 |

* cited by examiner

*Primary Examiner* — Aiqun Li

(57) ABSTRACT

Polylactide fibers are made from a blend of polylactides. One of the polylactides has a ratio of R-lactic and S-lactic units from 8:92 to 92:8. The second polylactide has a ratio of the R-lactic and S-lactic units of ≥97:3 or ≤3:97. The ratio of the R-lactic units to S-lactic units in the blend is from 7:93 to 25:75 or from 75:25 to 93:7. The polylactide fiber contains at least 5 Joules of polylactide crystallites per gram of polylactide resin in the fiber.

10 Claims, No Drawings

POLYLACTIDE FIBERS

This invention relates to polylactide fibers.

Polylactide (also known as polylactic acid or "PLA") is a thermoplastic polymer that is useful in a variety of applications. Among these is the production of various types of fiber products.

Some of the uses for polylactide fibers take advantage of the ability of these fibers to degrade under certain conditions. Unlike many other polymeric fibers, polylactides can degrade rapidly under the proper conditions, and in doing so form lactic acid or lactic acid oligomers that can be consumed by biological organisms and which are soluble in aqueous environments. Therefore, polylactide fibers have potential uses in the agricultural, forestry, marine and oil/natural gas industries. For example, polylactide fiber sheet products have been proposed for use as plant coverings, to shield young plants from direct sunlight. These plant coverings ideally can degrade in place, so they do not have to be collected when no longer needed and then stored and/or disposed of. Instead, it is desired that the coverings degrade into the soil, where the degradation products can be consumed by microbes.

In the oil and gas industry, polylactide resins are used in subterranean applications. See, e.g., U.S. Pat. Nos. 6,949,491 and 7,267,170. Their utility is based upon their capacity to degrade under conditions of temperature and moisture that exist in the well. For example, polylactide resins are sometimes used in hydraulic fracturing operations. In hydraulic fracturing, a fluid is pumped down the well and into the surrounding formation under high pressure. This creates or enlarges fissures in the formation and so provides pathways for gas and oil to flow to the well bore. The fracturing fluid contains a particulate solid, called a proppant, which is carried into the fissures and prevents the fissures from closing back up once the pressure is removed. One function of the polylactide is to help suspend the proppant in the fracturing fluid and carry it down the well bore and into the formation. The polylactide fibers are then deposited with the proppant in the fissures. The polylactide fibers then dissolve, leaving "wormholes" through with gas and oil can flow into the well.

Another use for polylactide resins in subterranean applications is the production of porous cements. Porous cements are sometimes wanted as well casings and gravel packs, again for the purpose of allowing production fluids to pass through and enter the well. One way of accomplishing this is to include particles of an acid-soluble carbonate compound in the cement composition. A polylactide resin can be included in the cement composition. The resin becomes trapped in the cement as it hardens and then degrades to produce an acid that dissolves the carbonate compound and produce the desired pores.

The rate at which the polylactide degrades is important in uses such as the agricultural and subterranean applications mentioned above. The degradation of polylactide is believed to proceed mainly through hydrolysis. The degradation rate is highly dependent on local conditions, including the temperature. Although polylactide often degrades rapidly when the local temperature is above 80° C., these very high temperatures are not present in agricultural areas, nor are they present in many subterranean formations. In those cases the polylactide can degrade quite slowly. Therefore, there is a desire to provide polylactide that degrades rapidly under more moderate temperature conditions.

As mentioned in both U.S. Pat. Nos. 6,949,491 and 7,267,170, the crystallinity of a polylactide can affect its degradation rate. For example, U.S. Pat. No. 7,267,170 mentions that poly-L-lactide is a crystalline polymer that hydrolyzes slowly. As such, it is suitable only if slow degradation can be tolerated. Conversely, U.S. Pat. No. 7,267,170 mentions that poly (D,L-lactide) is amorphous and degrades more rapidly, and suggests that this polymer may be suitable in some cases. U.S. Pat. No. 6,949,491 reports that a copolymer made from 13% D-isomer and 87% L-isomer degrades over several hours in boiling water to form a viscous liquid. However, a polymer containing only 6% of the D-isomer was reported not to degrade under those conditions, and for that reason U.S. Pat. No. 6,949,491 concludes "the relative amount of D- and L-isomer should be selected in the range from about 10 percent to 90 percent of an isomer". Polymers such as those are unable to crystallize except at most to a very small extent. In effect, U.S. Pat. No. 6,949,491 suggests to use a highly amorphous polylactide fiber.

Unfortunately, practical problems prevent highly amorphous polylactide fiber from being used in these applications. These problems have to do with fiber production in the first instance, and with transportation and storage in the second instance.

Highly amorphous polylactide polymers have been nearly impossible to produce at commercially acceptable operating rates. Fiber production processes require the resin to be processed at elevated temperatures, first to melt the resin and form it into fiber, and then while the newly-formed fiber undergoes subsequent processing steps, such as, for example, drawing and heat-setting. The problem with highly amorphous polylactide polymers is that they are tacky at the operational temperatures. Therefore, they stick to the equipment, which leads to a host of problems, including fiber breakage, frequent line stoppages, the individual filaments sticking together to form a hard mass, product inconsistencies, and so on. These problems can be overcome by operating at low temperatures and low manufacturing speeds, but fiber cannot be produced economically in large volumes under those conditions. In addition, the fibers cannot be "heat set", and so are very dimensionally unstable and exhibit large amounts of shrinkage, which precludes their use in almost every application.

The second problem with highly amorphous polylactide resin fibers is that they have a strong tendency to stick together and form large masses when they are stored. This can occur at temperatures as low as room temperature, but is mainly a problem when the fibers are exposed to moderately elevated temperatures, such as from 30-50° C. Exposure to temperatures such as these is very commonly seen in warehouses and during transportation. Therefore, special storage and handling conditions are necessary.

These problems with making and storing amorphous polylactide fibers are so troublesome that amorphous polylactide fibers are not available commercially except as very small volumes. Manufacturing and storage/transportation concerns require the fiber to be semi-crystalline.

Therefore, it is desirable to provide a polylactide fiber which is easily manufactured, stored and transported and which degrades rapidly even at moderately elevated temperatures.

In one aspect, this invention is a polylactide fiber that contains at least 75% by weight polylactide resin, wherein
(a) the polylactide resin is a blend of (1) 20 to 90% by weight of a first polylactide in which the ratio of the R-lactic and S-lactic units is from 8:92 to 92:8 and (2) from 80 to 10% by weight of a second polylactide in which the ratio of the R-lactic and S-lactic units is ≥97:3 or ≤3:97, and wherein the R-lactic units and S-lactic units combined constitute at least 90% of the weight of the second polylactide (b) the ratio of the R-lactic units to S-lactic units in the blend is from 7:93 to 25:75 or from 75:25 to 93:7; and (c) the polylactide fiber contains at least 5 Joules of polylactide crystallites per gram of polylactide resin in the fiber.

The blend of polylactide is surprisingly and unexpectedly able to form semi-crystalline fiber. The crystallinity that is obtained is significantly higher than would be expected from the ratio of R- and S-lactide units that are present in the polylactide resin blend as a whole. The second polylactide appears to crystallize during the fiber manufacturing almost as though the first polylactide is not present at all. The crystallinity permits the fibers to be manufactured easily and to transported and stored without special handling.

Even more surprisingly, the polylactide fiber degrades much more rapidly than conventional semi-crystalline polylactide fibers, and so is very well-suited for applications such as the agricultural and subterranean applications described above, where rapid fiber degradation is wanted. In particular, the fibers degrade rapidly in the presence of water under moderate temperature conditions (such as from 50 to 80° C. or from 60 to 80° C.), and even under the temperature and moisture conditions that are prevalent in agricultural settings.

In another aspect, this invention is a method for treating a subterranean formation, comprising a) introducing a treatment fluid into the subterranean formation, wherein
  (i) the treatment fluid contains a liquid phase and multiple polylactide fibers dispersed in the liquid phase, and
  (ii) the polylactide fibers have a denier of 0.5 to 20 per filament and the polylactide resin is a blend of (1) 20 to 90% by weight of a first polylactide in which the ratio of the R-lactic and S-lactic units is from 8:92 to 92:8 and (2) from 10 to 80% by weight of a second polylactide in which the ratio of the R-lactic and S-lactic units is ≥97:3 or ≤3:97, wherein the R-lactic units and S-lactic units combined constitute at least 90% of the weight of the second polylactide and further wherein the ratio of the R-lactic units to S-lactic units in the blend is from 7:93 to 25:75 or from 75:25 to 93:7; and the polylactide fiber contains at least 5 Joules of polylactide crystallites per gram of polylactide resin in the fiber, and then b) degrading the polylactide fibers in the subterranean formation.

For the purposes of this invention, the terms "polylactide", "polylactic acid" and "PLA" are used interchangeably to denote polymers of lactide having repeating units of the structure —OC(O)CH(CH$_3$)— ("lactic units"). The PLA resins each preferably contain at least 90%, such as at least 95% or at least 98% by weight of those repeating units.

Either or both of the polylactide resins may contain minor amounts such as up to 10%, preferably up to 5% and more preferably up to 2% by weight of residues of an initiator compound and/or repeating units derived from other monomers that are copolymerizable with lactide. Suitable such initiators include, for example, water, alcohols, glycol ethers, and polyhydroxy compounds of various types (such as ethylene glycol, propylene glycol, polyethylene glycol, polypropylene glycol, glycerine, trimethylolpropane, pentaerythritol, hydroxyl-terminated butadiene polymers and the like). Examples of copolymerizable monomers include glycolic acid, hydroxybutyric acid, other hydroxyacids and their respective dianhydride dimers; alkylene oxides (including ethylene oxide, propylene oxide, butylene oxide, tetramethylene oxide, and the like); cyclic lactones; or cyclic carbonates. The polylactide resins are most preferably essentially devoid of such repeating units derived from other monomers.

The polylactide resin may be capped with a capping agent such as an epoxide, a carbodiimide or oxazoline compound, to reduce and/or increase the amount of carboxyl terminal groups. Similarly, the polylactide resin may be reacted with a compound such as a carboxylic anhydride, again to increase the amount of carboxyl terminal groups. Increasing the amount of carboxyl terminal groups can increase degradation rates; therefore the amount of these capping agents can be used in some cases to tailor the degradation rate to a desired value.

Lactic acid exists in two enantiomeric forms, the so-called "S-" (or "L-") and "R"- (or "D-") forms. "Lactide" is a cyclic diester made from two lactic acid molecules (with loss of two molecules of water). The chirality of the lactic acid is preserved when lactic acid is formed into lactide. Therefore, lactide exists in several forms: 3S,6S-3,6-dimethyl-1,4-dioxane-2,5-dione (S,S-lactide), 3R,6R-3,6-dimethyl-1,4-dioxane-2,5-dione (R,R-lactide), or 3R,6S-3,6-dimethyl-1,4-dioxane-2,5-dione (R,S-lactide or meso-lactide). When lactide is polymerized to form PLA, the chirality is again preserved, and the PLA so produced will contain S- and R-lactic units in proportions close to the proportion of S- and R-units in the lactide (a small amount of racemization often occurs during the polymerization).

The fibers of this invention contain a mixture of a first polylactide and a second polylactide. The first polylactide contains S- and R-lactic units in the ratio of 8:92 to 92:8. That is, at least 8% of the lactic units in the first polylactide are S-units, and at least 8% of the lactic units in the first polylactide are R-units. It is preferred that the ratio of S- and R-units in the first polylactide is from 10:90 to 90:10. A more preferred first polylactide contains S- and R-lactic units in a ratio of 10 to 50% of S- or R-units and from 10 to 50% of the other units. The first polylactide is a highly amorphous grade that is crystallizable with difficulty and then only to a small extent. Preferably, it is crystallizable to the extent of no more than 5 J/g of PLA crystallites when quiescently heated (i.e., under no applied strain) at 125° C. for one hour.

At least 97% of the lactic units in the second polylactide are either S-lactic units or R-units, i.e., the ratio of S- and R-units is ≥97:3 or ≤3:97. This ratio may be ≥98:2 or ≤2:98, ≥98.5:1.5 or ≤1.5:98.5, and may be as high as 100:0 or as low as 0:100. The second polylactide is a semicrystalline grade that by itself crystallizes easily when quiescently heated at 125° C. for one hour to produce a semi-crystalline polymer containing 25 J/g or more of PLA crystallites.

The weight average molecular weights of each of the first and second polylactides is suitably within the range of about 30,000 to 500,000 g/mol, as measured by gel permeation chromatography against a polystyrene standard.

The first polylactide resin, and preferably both the first and second polylactide resin, preferably contains at least some carboxylic acid end groups. It is more preferred that the blend of polylactide resins contains about 15 to 50, more preferably from 20 to 30 milliequivalents of carboxyl end groups per kilogram of polylactide resins.

The polylactide resins can be prepared by polymerizing lactide in the presence of a polymerization catalyst as described in U.S. Pat. Nos. 5,247,059, 5,258,488 and 5,274,073. The polylactide may be a polymer of any of the lactide types mentioned above, including meso lactide. The preferred polymerization process typically includes a devolatilization step during which the free lactide content of the polymer is reduced, preferably to less than 1% by weight, more preferably less than 0.5% by weight and especially less than 0.2% by weight. The polymerization catalyst is preferably deactivated or removed from the starting high-D and high-L PLA resins.

The ratio of the first and the second polylactide resins in the fiber is from 20 to 90% of the first polylactide resin and correspondingly from 80 to 10% of the second polylactide resin, based on total polylactide resin weight. In some embodiments this ratio may be from 30 to 90% of the first polylactide and correspondingly from 10 to 70% of the second polylactide.

The blend of polylactide resins as a whole may contain a ratio of R-lactic units to D-lactic units in the range of 7:93 to 25:75 or from 75:25 to 93:7. A preferred ratio is from 8:92 to 20:80 or from 80:20 to 92:8. A still more preferred range is from 8:92 to 15:85 or from 85:15 to 92:8.

The polylactide resins are present as a blend, not as separate components of a multicomponent polymer. The resins may be melt-blended and/or solution-blended. Melt blending can be performed by separately melting the resins, and bringing the melts together, or by forming a mixture of particles of the resins and melting the mixture of the particles together to form the blend. Either of these melt-blending steps can be performed as part of the fiber-spinning process, in which the melt blend is formed and then spun into fibers without intermediate cooling to form a solid. Alternatively, the melt-blending step can be performed separately to form a solid mixture of the resins, which is then re-melted to be spun into the fibers. Similarly, solution blending can be performed by separately dissolving the resins and the mixing the solutions, or by dissolving both resins together. The solution-forming step can be incorporated into the fiber-spinning process.

The polylactide resins constitute at least 75% of the weight of the fiber, and may constitute as much as 100% thereof. In some particular embodiments, the polylactide may constitute at least 80%, at least 85%, at least 90% or at least 95% of the weight of the fiber. In addition to the polylactide resin, the fiber may contain, for example, colorants, slip agents, various types of fiber finishes, crystallization nucleating agents including particulate solids such as talc particles, other polymeric materials such as other aliphatic polyesters, polyolefins, poly(alkylene glycol)s and the like and plasticizers. The fiber may contain one or more agents that increases the hydrophilicity of the polylactide such as, for example diethylene glycol, triethylene glycol, poly(ethylene glycol). The fiber may also contain one or more catalysts for the hydrolysis of the polylactide resin, such as a carboxylic acid like lactic acid, glycolic acid and the like.

The polylactide fiber contains at least 5 Joules, preferably at least 10 Joules polylactide crystallites per gram of polylactide resin in the fiber. Polylactide crystallites have a crystalline melting temperature of from about 140 to 190° C., as measured by differential scanning calorimetry (DSC). A weighed amount of the polylactide fiber is placed in the differential scanning calorimeter and heated under an inert atmosphere such as nitrogen from room temperature to 250° C. at a rate of 20° C./minute. The enthalpy of melting over the temperature range 140 to 190° C. is measured as the amount of polylactide crystallinity in the fibers. This enthalpy is then divided by the weight of the sample to determine the amount of polylactide crystallites per gram of fiber in units of Joules/gram.

The polylactide fiber may contain as much as about 30 J/g of polylactide crystallites. A preferred amount is from polylactide crystallinity is from 10 to 25 J/g, and a more preferred amount is from 12 to 22 J/g. These amounts of crystallinity allow the fibers to be processed easily and provide the fibers with good storage stability.

The polylactide fiber preferably contains no more than 5 J/g, still more preferably no more than 2 J/g of other crystallites that melt in the temperature range from 20 to 250° C., as determined by DSC.

Applicants have found that through selection of (1) the ratios of the first and second polylactides and (2) the selection of the molecular weight of at least the first polylactide, it is possible to vary the rate at which the fiber degrades. This allows a certain amount of tailoring of the degradation rate of the fibers for specific applications. Within the aforementioned ranges of crystallinity, lower crystallinity levels tend to promote faster degradation. In addition, fibers in which the first polylactide (or both the first and second polylactides) have lower molecular weights also tend to degrade more rapidly. Thus, for example, when faster degradation rates are wanted, the first polylactide may have a weight average molecular weight in the range of 20,000 to 175,000 or from 40,000 to 125,000 or even from 50,000 to 100,000. Molecular weights lower than 40,000, especially those below 20,000, tend to make it difficult to process the resins into fiber. Conversely, when a somewhat slower degradation rate is wanted, the weight average molecular weight of the first polylactide resin may be from 100,000 to 300,000, preferably from 125,000 to 250,000.

A suitable test for degradation involves immersing 0.48 g of the fibers in 100 mL of a 0.1 M phosphate buffer solution for 6 days at 65° C. The mass loss of the sample is then determined. In some embodiments, the mass loss on this test is 5 to 35%, with values of 7 to 20% on this test, especially 10 to 20% on this test being preferred.

The fibers may be monofilament fibers, multifilament fibers, and/or conjugate fibers of various types. The fibers can be solid or hollow, and can have any cross-section, including circular, polygonal, elliptical, multilobal, and the like. The fibers can be formed using solution-spinning methods, melt-spinning methods, melt-blowing methods or spun-bonding methods, such as are described, for example in U.S. Pat. No. 6,506,873.

Crystallinity is not an inherent property of the polylactide fibers. The as-spun fibers typically contain very little crystallinity. Therefore, the fibers in most cases are subjected to some further treatment step during which the polylactide resin crystallizes. Such treatment steps may include drawing step, in which the fiber is drawn to reduce its diameter, and/or a heat-setting step, in which the fibers are heated to a temperature between the glass transition temperatures of the polylactide resins and their crystallization melting temperatures (such as between 90 to 140° C.). Drawing can be done in various ways, such as by mechanically stretching the conjugate fiber as it is spun or afterwards, or using a melt-blowing method or spun-bonding method, such as are described in U.S. Pat. Nos. 5,290,626 and 6,506,873. A heating step may be performed by bringing the fiber to a temperature of from 90 to 140° C., preferably from 110 to 130° C., for several seconds to several minutes. The fibers may be both drawn and heat-set. Drawing and heating steps may be performed simultaneously or sequentially.

The physical dimensions of the fibers are chosen in connection with the intended end-use application. The diameter of the fibers of course affects their degradation rates (as does the cross-sectional shape), as smaller diameter fibers have greater surface areas per unit weight. The diameter of the fibers also affects their physical and flexural characteristics and so is selected in any particular case in accordance with the requirements of the particular end-use application. The fibers may have, for example a denier of 0.5 to 100 (weight in grams per 9000 meters length) per filament. A more typical denier per filament is from 0.5 to 20, more preferably from 0.5 to 5 and still more preferably from 0.8 to 2.5.

The fibers may be continuous filament, short "staple" fiber (which may have, for example, lengths from 5 up to 150 mm, preferably from 12 to 50 mm), and/or in the form of woven or non-woven materials.

The fibers also preferably exhibit no greater than 50%, more preferably no greater than 25% shrinkage, especially from 5 to 25% shrinkage when heated in air at 80° C. for 10 minutes.

For certain agricultural applications, the fibers are preferably formed into a woven or non-woven fabric. The fabric may have openings or pores that allow a portion of incident sunlight to pass through, while the fabric blocks (by absorption and/or reflection, for example) a remaining portion of the sunlight. The fabric may, for example, allow from 10 to 90% or from 25 to 75% of incumbent sunlight to pass through. Such a fabric is useful as a plant cover, to protect young plants and/or plants with tender shoots from being exposed to too much sunlight. Such a fabric may also help reduce the loss of moisture from the soil and/or the plants through evaporation. The fibers typically degrade enough during a growing season that they become brittle. The brittle fibers are easily broken up during tilling, during which they are easily turned into the soil where further degradation can occur through the action of microbes.

Certain fibers of the invention are useful in treating subterranean formations. In such a treatment process, a treatment fluid containing the fibers is introduced into the subterranean formation, and the fibers are then degraded. In this case, the fibers preferably are in the form of relatively short monofilament and/or multifilament fibers, including "staple" fibers described above.

The treatment fluid includes at least the fibers and a liquid phase. The liquid phase may include, for example, water, brine, oil, viscous waxes or mixture of two or more thereof. The liquid phase may further contain various liquid or dissolved functional materials such as thickeners (such as dissolved organic polymers), surfactants, suspension aids, pH adjusters (including acidic or basic materials), pH buffers, and the like.

The treatment fluid may further contain various suspended solids (in addition to the fibers) as may be useful in the particular treatment method.

One class of suspended solids includes a proppant. A "proppant" is a particulate material, insoluble in the treatment fluid, which is introduced with the treatment fluid in a hydraulic fracturing process to hold open fissures that are produced during the fracturing step. Examples of suitable proppant materials include, for example, sand, gravel, metals, walnut shells, ground coconut shells, various ceramic proppants as are commercially available from CarboCeramics, Inc., Irving, Tex., and the like.

Another class of suspended solids includes a hydraulic cement, by which is meant a material or mixture of materials that forms a hard hydrate, including Portland, Portland cement blends, pozzolan-lime cements, slag-lime cements, calcium aluminate cements, calcium sulfoaluminate cements and similar cements. A hydraulic cement may also include particles of one or more acid-soluble carbonates.

The treatment fluid may contain, for example, from 1 to 50 volume percent of the fibers. A preferred amount of fibers is from 1 to 20 volume percent.

Well treatment methods of particular interest include hydraulic fracturing and gravel packing.

In a hydraulic fracturing method in accordance with the invention, the treatment fluid contains the fibers of the invention suspended in the liquid phase. The treatment fluid will in most cases also include a proppant and/or a hydraulic cement. One benefit of the fibers is that they help to reduce the settling of the proppant from the liquid phase. The treatment fluid is pumped into the well and into the surrounding formation under high pressure to creates or enlarges fissures in the formation. The fibers, together with any proppant and/or hydraulic cement as may be present, deposit in the fissures. When a proppant or cement is present, the fibers become interspersed within the proppant or cement particles. When the pressure is removed, the deposited materials prevent the fissures from closing. If a hydraulic cement is present in the treatment fluid, it will set in the fissures, encapsulating at least some of the fibers. When the fibers degrade, they form a liquid or water-soluble material that is easily washed away either by the production fluids or by pumping additional fluids through the formation. The spaces vacated when the fibers degrade form flow paths (wormholes) through the fissures through which the production fluids can flow to the well bore from which they can be recovered from the well. When a proppant is present, flow paths are formed between the proppant particles when the fibers degrade. Fibers that are encapsulated in cement degrade to form flow paths through the cement. If acid-sensitive carbonate particles are included in the cement, the acids that form when the fibers degrade also helps those particles to dissolve, further increasing the porosity of the cement.

Gravel packing is often performed in a well that extends through unconsolidated formations that contain loose or incompetent sands that can flow into the well bore. In gravel packing, a steel screen, slotted liner, perforated shroud or like device is emplaced in the well to create an annulus surrounding the well bore. This annulus is packed with prepared gravel of a specific size designed to prevent sand from entering the well. In a gravel packing method of this invention, the treatment fluid includes the liquid phase, fibers as described above, gravel, and optionally a hydraulic cement. The treatment fluid is pumped into the annulus such that the fibers, gravel and cement (if present) are captured within the annulus. If a cement is present, it sets in the annulus. As before, flow paths are produced through the gravel pack when the fibers degrade.

The fibers are degraded by exposure to water and elevated temperature. Both of these conditions usually exist within wells for producing oil or natural gas. However, if either or both of these conditions are lacking, or if insufficient water is present and/or a higher temperature is needed, water and/or heat can be supplied to the subterranean formation. This is conveniently done by injecting steam or hot water into the formation.

The rate at which the fibers degrade will of course depend on the presence of water and the ambient temperature. Assuming the presence of enough water, faster degradation is generally seen with increasing temperature.

An advantage of this invention is that rapid degradation is seen even at moderate temperatures, such as from 50 to 79° C., especially 60 to 79° C., although higher temperatures, up to 150° C. or greater, can be used. Ambient well temperatures are often adequate. Under these conditions, degradation of the fibers often occurs within 1 to 7 days, more typically 1-3 days, after emplacement in the formation.

The following examples are provided to illustrate the invention, and are not intended to limit the scope thereof. All parts and percentages are by weight unless otherwise indicated.

EXAMPLES 1-3

A polylactide resin containing 88% of S-lactic units and 12% of R-lactic units and having a weight average molecular weight of about 170,000 is passed multiple times through an extruder. This reduces the molecular weight to about 130,000 g/mol. The so-treated polymer is formed into pellets. 70 parts by weight of these pellets are mixed with 30 parts by weight of pellets of a second polylactide resin that contains 98.6% of S-lactic units and 1.4% of R-lactic units and has an $M_w$ of about 160,000. The mixture of polylactide resins contains about 8.8% R-lactic units and 91.2% S-lactic units. This mixture is melt-spun, heat-set and drawn to produce multifilament staple fiber having a denier of 15-20/filament. The resulting fiber designated as Example 1. It contains 15 J/g of polylactide crystallites by DSC, which is very significantly in excess of the value expected to be obtained with a PLA resin that contains a ratio of 8.8:91.2 R- to S-lactic units. The resin processes easily at high spinning speeds.

Fiber Example 2 is made in the same way, except the ratio of the first polylactide resin to the second polylactide resin is 65:35. The mixture of polylactide resins contains about 8.3% R-lactic units and 91.7% S-lactic units. This fiber contains 9 J/g of polylactide crystallites, which is very significantly in excess of that expected given the ratio of R- to S-lactic units in the resin blend.

Fiber Example 3 is again made in the same way, except the ratio of the first polylactide resin to the second polylactide resin is 60:40. The mixture of polylactide resins contains about 7.8% R-lactic units and 92.2% S-lactic units. This fiber contains 22 J/g of polylactide crystallites, which again is unexpectedly high given the ratio of R- to S-lactic units in the resin blend.

Comparative Fiber A is prepared in the same manner, using only the first polylactide resin. It contains no measurable crystallinity. These fibers block when baled and stored at ambient temperatures.

The fiber samples are heated at 57° C. for to assess shrinkage. Shrinkage on this test is a good proxy for the tendency of the fibers to block (i.e., become stuck together) upon storage at slightly elevated temperatures as might be encountered during storage and/or transportation. Greater shrinkage indicates a greater tendency to block.

Comparative Sample A exhibits 11.5% shrinkage on this test. Examples 1-3 exhibit only 8.4, 6.25 and 0% shrinkage, respectively, demonstrating that the blend of polylactides is much more resistant to blocking at moderately elevated temperatures than the single resin.

EXAMPLES 4-8 AND COMPARATIVE SAMPLES B-E

The following PLA resins are used to make fiber Examples 4-8 and Comparative Samples B-E:

| Designation | $M_n$ | $M_w$ | % R enantiomer |
|---|---|---|---|
| A | 57,000 | 111,000 | 11.7 |
| B | 60,000-65,000 | 125,000 | 50 |
| C | 60,500 | 100,000 | 1.6 |
| D | 66,000 | 127,000 | 0.6 |
| E | 53,500 | 99,500 | 4.3 |

Fibers are spun from PLA resins A-E or blends thereof as indicated in Table 1 below by melt-spinning through a 0.3 mm spinneret, drawing and heat-setting to form circular cross-section solid filaments having a diameter of 12 microns.

The molecular weight of the resins is determined by gel permeation chromatography. The glass transition temperature, melting temperature and enthalpy of melting are determined on a sample of the resin or resin blend by differential scanning calorimetry. Melting temperature and enthalpy of melting are measured by heating from −25° C. to 225° C. at the rate of 50° C./minute. Glass transition temperature is measured by heating from 0° C. to 210° C. at 20° C./minute.

Acid end group content is determined by titration.

The fibers are evaluated for blocking by chopping 2.5 g of fiber into 2.5-5 cm lengths. The chopped fibers are placed in a preheated cup and a preheated 1 kg weight is applied to the fibers. The assembly is then placed in a preheated oven at 80° C. for 10 minutes. The sample is then removed and visually inspected to evaluate whether the fibers have stuck together to form a mass.

To evaluate hot air shrinkage, the fibers are cut into approximately 25 cm lengths, measured, and placed on a Teflon sheet. The fibers and sheet are then placed in a preheated 80° C. oven for five minutes. The fibers are then removed and their lengths re-measured.

Hot water degradation is measured as follows: 0.48 grams of 2.5-10 cm fibers are fully immersed in 100 mL of a 0.1M phosphate buffer solution. The container is then heated in a water bath at 65° C. for 6 days. The flask contents are then filtered through a glass filter and rinsed twice with 30 mL aliquots of deionized water. The filtered and rinsed fibers are then dried to constant mass in a vacuum oven and weighed to determine % mass loss.

Results are as indicated in the Table 1.

TABLE 1

| Property | B* | Ex. 4 | Ex. 5 | Ex. 6 | Ex. 7 | Ex. 8 | C* | D* | E* |
|---|---|---|---|---|---|---|---|---|---|
| Resin(s) | A | B/C (50/50) | B/C (30/70) | B/C (20/80) | A/C (70/30) | A/D (60/40) | E | C | D |
| % R enantiomer | 11.7 | 24.1 | 15.0 | 11.0 | 8.1 | 7.0 | 4.3 | 1.6 | 0.6 |
| $M_n$ 1000 g/mol | 57 | 60 | 66 | 61 | 63 | 64 | 53 | 60 | 66 |
| $M_w$ 1000 g/mol | 111 | 112 | 109 | 106 | 109 | 117 | 99 | 100 | 127 |
| $T_m$, ° C. | N/A | 172 | 172 | 171 | 168 | 177 | 155 | 174 | 182 |

TABLE 1-continued

| Property | B* | Ex. 4 | Ex. 5 | Ex. 6 | Ex. 7 | Ex. 8 | C* | D* | E* |
|---|---|---|---|---|---|---|---|---|---|
| Enthalpy melting (J/g) | N/A | 25.5 | 32.8 | 36.0 | 19.9 | 24.0 | 30.3 | 45.6 | 53.1 |
| $T_g$, ° C. | 51.7 | 48.6 | 52.6 | 53.4 | 55.0 | 55.5 | 54.3 | 56.3 | 56.0 |
| 80° C. Hot Air Shrinkage, % | 70 | 21.8 | 13.5 | 10.3 | 19.0 | 9.8 | 6.2 | 6.2 | 1.5 |
| Hot water degradation, % mass loss | 25.5 | 27.8 | 17.7 | 12.9 | 10.8 | 5.4 | 5.6 | 0 | 4.2 |
| 80° C. Blocking | Fail | Fail | Pass | Pass | Pass | Pass | Pass | Pass | Pass |

Comparative Sample B shows the effect of using a single, amorphous grade PLA resin that has about 12% of the R-enantiomer. The material cannot be crystallized, and thus has a very high hot air shrinkage value and blocks badly at 80° C. (and lower temperatures).

Comparative Samples C-E show the effect of using a single, semi-crystalline grade of PLA resin that has 0.6 to 4.3% of the R-enantiomer. Shrinkage is very low, but so is degradation, and these single resins are unsuitable for use in applications in which somewhat rapid degradation is necessary.

Examples 4-8 show the effect of using a blend of an amorphous grade of PLA resin and a semi-crystallizable grade. Example 6 has an overall R-enantiomer content very close to that of Comparative Sample B. It degrades more slowly than Comparative Sample B, but does not block and exhibits much less shrinkage on the 80° hot air shrinkage test. Examples 4 and 5 show that very high levels of R-enantiomer can be tolerated if a blend of PLA resins is used instead of a single resin (as in Comparative Sample B), and also show how degradation rates can be tailored by adjusting the overall level of the less-predominant enantiomer (the R-enantiomer in this case). As Example 4 shows, degradation rates as high as the pure amorphous grade polymer (Comp. Sample B) can be obtained with the blend, while avoiding the very large shrinkage problem exhibited by Comp. Sample B. Example 4 resides at the limits of the invention, as some tendency to block is seen with this example.

The results in Examples 4-6 are particularly surprising because the amorphous grade of polylactide resin is a polymer of meso-lactide, which contains the R- and S-enantiomers in nearly equal amounts and which cannot be crystallized by itself at all. The use of the poly(meso-lactide) results in a very high overall R-enantiomer content in the blend, yet the blend is capable of being crystallized enough to prevent blocking while at the same time providing useful degradation rates.

Example 8 resides at the low limit of overall R-enantiomer content. The degradation rate is low for this sample. In this sample, the semi-crystalline resin has a very low R-enantiomer content. That semi-crystalline resin is believed to crystallize very efficiently (as evidenced by the high crystalline melting temperature for that sample). That efficient crystallization, together with the low overall R-enantiomer level, is believed to account for the low degradation rate. As indicated by the other experiments, a slightly higher overall R-enantiomer content (as in Example 6) is expected to lead to an increase in degradation rate for that sample.

What is claimed is:

1. A polylactide fiber that contains at least 75% by weight polylactide resin, wherein (a) the polylactide resin is a blend formed by melt blending, solution blending or both melt blending and solution blending (1) 20 to 90% by weight of a first polylactide in which the ratio of the R-lactic and S-lactic units is from 50:50 to 10:90 and (2) from 80 to 10% by weight of a second polylactide in which the ratio of the R-lactic and S-lactic units is ≤3:97, and wherein the R-lactic units and S-lactic units combined constitute at least 90% of the weight of the second polylactide (b) the ratio of the R-lactic units to S-lactic units in the blend is from 8:92 to 20:80; and (c) the polylactide fiber contains at least 5 up to 30 Joules of polylactide crystallites having a melting temperature of 140° C. to 190° C. per gram of polylactide resin in the fiber and no more than 5 J/g of other crystallites that melt in the temperature range of 20° C. to 250° C.

2. The fiber of claim 1, wherein the blend of polylactide resins contains about 15 to 50 milliequivalents of carboxyl end groups per kilogram of polylactide resins.

3. The fiber of claim 2, wherein the first polylactide resin has a weight average molecular weight from 40,000 to 125,000.

4. The fiber of claim 3, which contains at least 10 Joules of polylactide crystallites per gram of polylactide resin in the fiber.

5. The fiber of claim 4, which contains 12 to 22 Joules of polylactide crystallites per gram of polylactide resin in the fiber.

6. The fiber of claim 1, which loses 7 to 20% of its mass upon immersing 0.48 g of the fiber in 100 mL of a 0.1 M phosphate buffer solution for 6 days at 65° C.

7. The fiber of claim 6, which exhibits 5 to 25% shrinkage when heated in air at 80° C. for 10 minutes.

8. The fiber of claim 1, which contains an agent that increases the hydrophilicity of the polylactide resin, or a catalyst for the hydrolysis of the polylactide resin, or both.

9. A plant covering comprising the fiber of claim 1.

10. A blend of polylactide resins formed by melt blending, solution blending or both melt blending and solution blending (1) 20 to 90% by weight of a first polylactide in which the ratio of the R-lactic and S-lactic units is from 50:50 to 10:90 and (2) from 80 to 10% by weight of a second polylactide in which the ratio of the R-lactic and S-lactic units is ≤3:97, and wherein the R-lactic units and S-lactic units combined constitute at least 90% of the weight of the second polylactide, wherein the ratio of the R-lactic units to S-lactic units in the blend is from 8:92 to 20:80.

* * * * *